(12) United States Patent
Wunderlich

(10) Patent No.: US 8,662,809 B2
(45) Date of Patent: Mar. 4, 2014

(54) PARTICLE BOARD SCREW

(75) Inventor: Andreas Wunderlich, Kupferzell (DE)

(73) Assignees: SWG Schraubenwek Gaisbach GmbH, Waldenburg (DE), part interest; Wuerth International AG, Chur (CH), part interest ( * ) Notice: Subject to any disclaimer, the term of this patent is extended or adjusted under 35 U.S.C. 154(b) by 519 days.

(21) Appl. No.: 12/598,955

(22) PCT Filed: May 6, 2008

(86) PCT No.: PCT/EP2008/003601
§ 371 (c)(1),
(2), (4) Date: Nov. 5, 2009

(87) PCT Pub. No.: WO2008/138510
PCT Pub. Date: Nov. 20, 2008

(65) Prior Publication Data
US 2010/0129175 A1  May 27, 2010

(30) Foreign Application Priority Data

May 11, 2007 (DE) .......................... 10 2007 024 223

(51) Int. Cl.
*F16B 25/00* (2006.01)
(52) U.S. Cl.
CPC .................................. *F16B 25/0031* (2013.01)
USPC ....................................... 411/387.2; 411/386
(58) Field of Classification Search
USPC ................................ 411/386–387.7, 493, 497
See application file for complete search history.

(56) References Cited

U.S. PATENT DOCUMENTS

| 684,774 | A |   | 10/1901 | Baggs |
| 2,382,019 | A |   | 8/1945 | Miller |
| 2,654,284 | A | * | 10/1953 | Schevenell ................ 411/387.4 |
| 2,959,086 | A |   | 11/1960 | Gerlach et al. |
| 3,045,523 | A | * | 7/1962 | Reed, II ..................... 411/387.1 |
| 3,438,299 | A |   | 4/1969 | Gutshall |
| 4,027,573 | A | * | 6/1977 | Laverty .......................... 411/413 |
| 4,241,638 | A | * | 12/1980 | Shimizu et al. .............. 411/386 |
| 5,358,366 | A | * | 10/1994 | Suzuki .......................... 411/311 |
| 6,328,516 | B1 | * | 12/2001 | Hettich ...................... 411/387.2 |
| D567,644 | S | * | 4/2008 | Liu ................................. D8/387 |
| 2003/0235483 | A1 | * | 12/2003 | Chen ........................ 411/387.7 |
| 2005/0069396 | A1 | * | 3/2005 | Wu ................................ 411/411 |
| 2006/0153662 | A1 |   | 7/2006 | Chen |
| 2006/0251493 | A1 | * | 11/2006 | Buhl ............................ 411/386 |
| 2007/0154285 | A1 | * | 7/2007 | Tong ......................... 411/387.2 |

FOREIGN PATENT DOCUMENTS

| AT | 407 778 B | 6/2001 |
| DE | 43120 | 5/1888 |
| DE | 30 05 166 A1 | 8/1981 |

(Continued)

*Primary Examiner* — Flemming Saether
(74) *Attorney, Agent, or Firm* — Boyle Fredrickson, S.C.

(57) ABSTRACT

The invention relates to a particle board screw having a conical screw tip with a thread. The thread extends from the screw shaft to the front end of the screw tip. In order to make it easier to screw in, and in order to reduce the splitting effect in wood, a shoulder or rib is disposed in the front region of the screw, which is to say on the end or inside of the tapering part, preferably extending around the entire circumference with no pitch. The rib has a front flank running almost transversely to the longitudinal axis of the screw and a more strongly inclined rear flank. The screw has a reduced screw-in torque.

13 Claims, 2 Drawing Sheets

(56) References Cited

FOREIGN PATENT DOCUMENTS

| DE | 93 14 006.1 | 1/1994 |
| DE | 10 2005 031 534 A1 | 1/2007 |
| WO | WO 2006/001908 A2 | 1/2006 |

\* cited by examiner

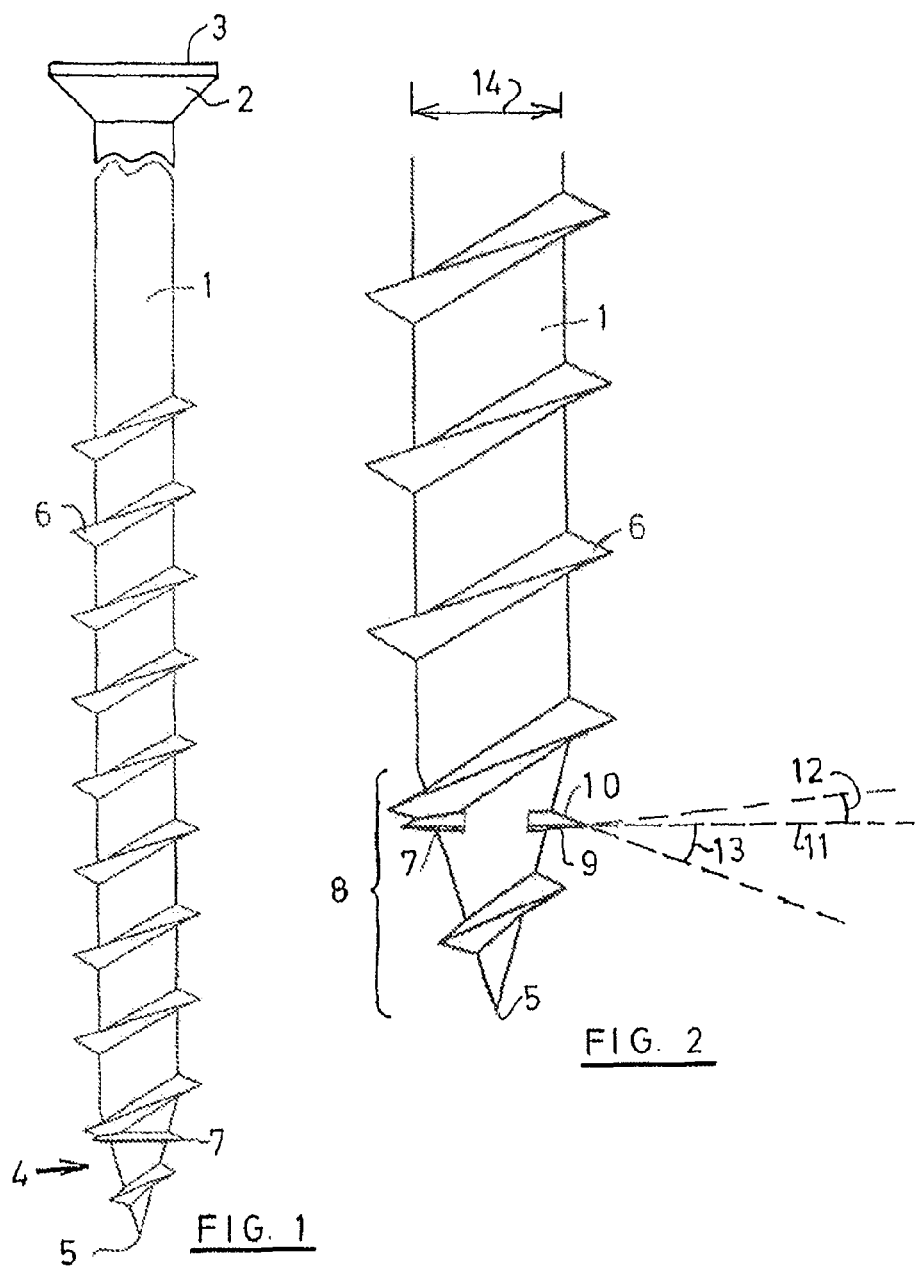

PARTICLE BOARD SCREW

TECHNICAL FIELD

The invention relates to a screw with a conical screw tip.

DESCRIPTION OF THE BACKGROUND ART

Screws of this kind are frequently also designated as particle board screws because they are intended, for instance, for screwing into particle boards. These screws have a screw shaft with a thread and a screw head which can be of different design and which serves to drive a screw with a driving tool.

To facilitate screwing into wood or material similar to wood, for instance particle boards, these screws have differently designed screw tips, partially also with actual cutting edges. These must be manufactured in a special process.

With the screws with a conical screw tip, the screw thread often extends up to the tip region. On the one hand, the screw should be capable of driving into the material without having to drill a pilot hole, and on the other hand, it should facilitate a very rapid screwing process. For this reason it is reasonable to form the screw thread as far up to the front end of the screw tip as possible.

When wood is used, cracks can arise due to the wedge effect of a conical screw tip.

There are different methods of how one can prevent the splitting effect and facilitate the screwing process despite a conical screw tip. One of these possibilities comprises forming a scraping point on the screw tip, which extends roughly in axial direction or which is slightly inclined to the axial direction and hence interrupts the thread pitch in this region (DE 102005031534).

The task of the invention is to provide a screw with a conical screw tip, which reduces the splitting effect when screwing in wood and at the same time reduces the screwing torque of the screw in contrast to the solutions known to date.

SUMMARY OF THE INVENTION

The screw proposed by the invention thus comprises a shoulder which is oriented towards the screw tip and either forms the end of the screw shaft or is disposed within the conically tapering section of the screw. Surprisingly it has been proved that this screw tip formation can actually reduce the splitting effect of the screw in wood. When driving in the screw, the wood fibres are pressed in the screwing direction and tear apart. This is the reason why the wedge effect of the screw tip decreases.

It has proven to be particularly reasonable to form a full circumference rib on which the shoulder is formed in the region of the screw tip.

The rib preferably extends as an uninterrupted rib around the entire screw shaft, thus is formed as a ring rib. However, it can be sufficient that it only extends over a part of the circumference, thus that it is interrupted at one point or at several points. It should at least cover 50% of the circumference, preferably at least 75%. In following the expression—ring rib—is used. It should nonetheless comprise the case that the rib is interrupted.

The rib preferably lies in one plane even if certain deviation from a plane should still be within the scope of the invention. The plane preferably lies transversely to the longitudinal axis of the screw.

In a further development of the invention it can be provided that said rib is disposed behind at least one half of a turn of the screw thread, preferably behind a full thread turn. In this manner it should be achieved that the thread first reaches the front end before the effect of the ring rib comes into play.

In particular, it can be provided that the rib is disposed at a distance of at least two thirds to four fifths of the length of the screw tip, with a gap from the front end of the screw.

In yet another development of the invention, it can be provided that the outer diameter of the ring rib is at least as large as the diameter of the screw shaft, preferably somewhat larger. For instance, a screw with an outer diameter of 8 mm should have an outer diameter of the rib of about 0.5 to 0.6 mm larger than the core diameter of the screw.

In yet another development of the invention, it can be provided that the ring rib is formed with a sharp edge.

According to the invention, it can be provided in a further development that the ring rib features an asymmetrical profile, wherein the inclination of the front flank preferably lies closer to a transverse plane of the longitudinal axis of the screw rather than closer to the rear flank.

For instance, the angle between the front flank of the ring rib and the transverse plane can lie in the region of about 15°, whereas the angle of the rear flank lies in a region of about 40°. The type of formation of the front flank is decisive for the effect of the ring rib, whereas the rear flank only serves to keep the ring rib accordingly stable.

In particular it can be provided that the ring rib is also rolled in one working step during the manufacture of the screw thread.

Further features, details, and preferences of the invention are derived from the claims and abstract of the invention, the wordings of which relate to the content of the description or the following description of the preferred embodiment of the invention and of the drawing. The figures are as follows:

BRIEF DESCRIPTION OF THE DRAWINGS

FIG. 1 shows a side view of a screw according to the invention;

FIG. 2 shows the front region of the screw with marked angles in a magnified scale;

DETAILED DESCRIPTION

Figure 3:
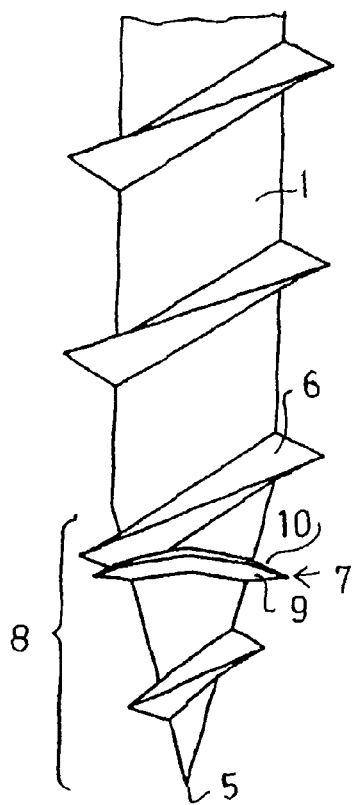
FIG. 3 shows a view corresponding to FIG. 2 in a second embodiment.

The particle board screw depicted in FIG. 1 in the side view comprises a cylindrical screw shaft 1, which is provided with a screw head 2 at its top end in FIG. 1. The screw head 2 depicted in the example is a countersunk head that features a plane face surface 3. From the face surface 3 a screw driver depression extends inside the inner part of the screw head 2. This is not depicted in detail.

A screw tip 4 is formed at the end of the screw facing away from the screw head 2, within which the diameter of the screw shaft decreases continuously until a front tip 5 is formed.

Above the part of the screw shaft 1 facing away from the screw head 2, a thread 6 extends, which also extends over the screw tip 4 and ends shortly before, exactly or after the tip of the end 5.

Within the screw tip 4 is a ring rib 7 rolled on the screw in a region between the front end 5 of the screw tip 4 and the beginning of the cylindrical part of the screw shaft 1.

A fully revolving ring rib 7 is depicted in the example.

Details of the screw tip and ring rib 7 are depicted in FIG. 2. The length 8 of the screw tip 4 is measured from the point at which the screw shaft 1 decreases in diameter, and extends up to the actual end 5 of the screw. The ring rib 7 is disposed in a region that is nearer to the cylindrical part of the screw shaft 1 than to the tip screw tip 5. It contains a front flank 9, thus a flank that is oriented towards the screw tip 5. A rear flank 10 is formed on the other side. The angle 12 between the surface of the front flank 9 and a plane 11 running transversely to the longitudinal screw axis is about 15°. The angle 13 between the rear flank 10 and the above-mentioned transverse plane 11 is about 40°.

The outer diameter of the sharp-edged ring rib 7 in the depicted example is a bit larger than the diameter 14 of the cylindrical part of the screw shaft 1.

The arrangement of the ring rib 7 is selected such that the thread 6 in front of the ring rib 7 features at least a half, preferably a full thread turn, so that the screw already grips the wood before the effect of the ring rib 7 comes into play.

Surprisingly it has been proven that the screw-driving torque is substantially reduced in comparison with conventional screw tips.

The screw in the depicted example features a countersunk head. It is obvious that the shape and formation of the screw head 2 here is only considered as an example, the measures proposed by the invention find application in screws with all common types of screw heads.

Turning now to FIG. 3. While in the embodiment depicted in FIGS. 1 and 2 the rib 7 is formed as a smooth ring, FIG. 3 shows a possibility of forming a rib 7 as a somewhat corrugated ring, wherein the corrugated shape is only minor. A maximum of four troughs and crests of the wave are provided. This rib is disposed approximately at the same point within the tapering screw tip 4 as is the case in the preceding embodiment.

Figure 4:
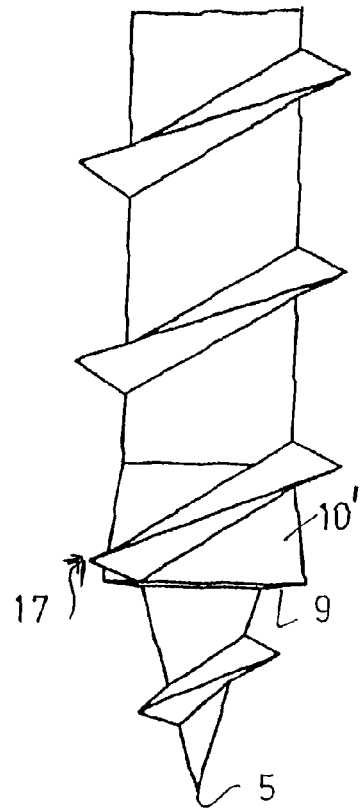
FIG. 4 shows a view corresponding to FIG. 3 in a further embodiment.

FIG. 4 shows a possibility of how the rib 17 can be formed likewise, wherein also here the front flank 9 of the rib 17 is inclined at approximately the same angle relative to the transverse plane as in the preceding embodiments. This is of less importance on the rear flank 10.

Figure 5:
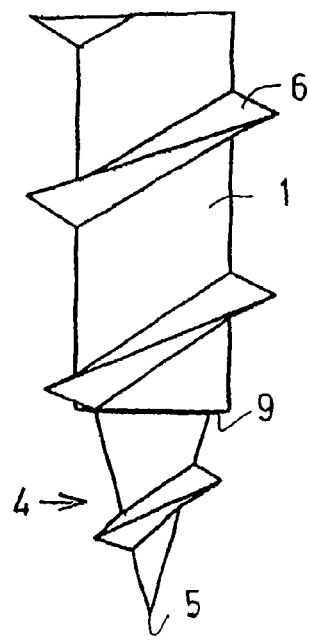
FIG. 5 shows a view corresponding to FIGS. 2 to 4 in yet another embodiment.

FIG. 5 shows yet another further development in which the front flank 9 is formed as a shoulder at the end of the cylindrical part of the screw shaft 1. The screw tip 4 starts practically with a smaller base area in diameter than the base area of the end of the screw shaft. Here also, a face surface is formed running approximately transversely to the longitudinal axis of the screw, which performs the above-mentioned task, namely—cutting wood fibers into bits.

The invention claimed is:

1. A screw, comprising:
a screw head,
a screw shaft having a cylindrical part extending from the screw head and an approximately conical tip part, the tip part extending from an end of the cylindrical part and having a diameter that becomes continuously smaller towards a front end of the screw shaft, and
the screw shaft having a thread that runs around the screw shaft in a plurality of turns until reaching the front end,
wherein a front flank is positioned at the end of the cylindrical part of the screw shaft, or on the conical tip part of the screw shaft, the front flank having a diameter that is greater than a largest diameter of the conical screw tip part and said front flank revolving at least over a half part of the circumference of the screw shaft and being oriented facing towards the front end; and
wherein the front flank extends in a transverse plane that is at least substantially perpendicular to a longitudinal axis of the screw.

2. The screw according to claim 1, in which the front flank is formed on a rib independent of the thread within the screw tip part.

3. The screw according to claim 2, in which the rib covers in a range from at least 50% to no more than 75% of the circumference.

4. The screw according to claim 2, in which the rib is sharp-edged in form.

5. The screw according to claim 2, in which the rib features an asymmetric profile.

6. The screw according to claim 2, in which the rib has the front flank, and the front flank is at a smaller acute angle from transverse to the longitudinal axis of the screw than a rear flank of the rib.

7. The screw according to claim 2, in which the angle between the front flank of the rib and a transverse plane that runs transversely to the longitudinal axis lies in the region of about fifteen degrees.

8. The screw according to claim 2, in which the angle between a rear flank of the rib and a transverse plane that runs transversely to the longitudinal axis lies in the region of about forty degrees.

9. The screw according to claim 2, in which the rib is also rolled when rolling the thread of the screw.

10. The screw according to claim 1, in which the rib is formed as a continuous ring rib.

11. The screw according to claim 1, in which a rib on which the front flank is formed, is disposed behind at least a half of a turn of the thread, up to a full turn of the thread.

12. The screw according to claim 1, in which a rib on which the front flank is formed, is disposed at a distance of at least two-thirds to four-fifths of the length of the screw tip.

13. The screw according to claim 1, in which an outside diameter of a rib on which the front flank is formed, is at least as large as or is greater than the diameter of the cylindrical part of the screw shaft.

* * * * *